3,235,597
N-ARYLOXYALKYL AND ARYLTHIOALKYL
DERIVATIVES OF CYCLOPROPYLAMINE
Jack Mills and Richard W. Kattau, Indianapolis, Ind., assignors to Eli Lilly and Company, Indianapolis, Ind., a corporation of Indiana
No Drawing. Filed Aug. 12, 1963, Ser. No. 301,632
6 Claims. (Cl. 260—570.5)

This invention relates to derivatives of cyclopropylamine. More particularly this invention relates to β-aryloxyethyl- and β-arylthioethylcyclopropylamines.

The novel compounds of this invention can be represented by the following structural formula:

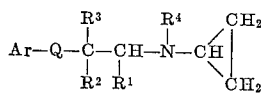

wherein Q is oxygen or sulfur; $R^1$, $R^2$ and $R^3$ are hydrogen or lower alkyl of 1 to 5 carbon atoms; $R^4$ is hydrogen or methyl; and Ar is naphthyl or phenyl.

The aryl ring can have one or more substituents such as halogen, lower alkyl, lower alkoxy, trifluoromethyl, nitro and the like, frequently with improved results. It is to be understood that the compounds so substituted are within the spirit of the invention and are to be considered within the scope thereof. In fact, compounds containing chloro, methyl and/or methoxy substituents on the aryl ring are among the preferred embodiments of the invention.

Also a part of the invention are the acid addition salts of the above-defined basic compounds formed with pharmaceutically acceptable organic and inorganic acids. The said salts can be easily prepared by methods known in the art, such as by the reaction of the base with the calculated amount of acid in an aqueous solvent system followed by isolation of the salt by concentration and cooling, or by the reaction of the base with the desired acid in a solvent system from which the desired salt precipitates directly. Exemplary of the inorganic acids which may be employed are hydrochloric, hydrobromic, sulfuric, phosphoric, nitric, and like acids. Among the organic acids which may be employed for salt formation are acetic, propionic, maleic, fumaric, benzoic, p-toluenesulfonic, salicylic, mandelic, cinnamic, p-aminobenzoic, ascorbic, succinic, citric, tartaric, malic, pamoic, and like acids.

The novel compounds of this invention can be prepared by a variety of methods well known in the art. One such method involves the alkylation of cyclopropylamine by a β-aryloxyethyl halide or a β-arylthioethyl halide in conventional fashion. Another convenient method for the preparation of the amino derivatives of this invention involves the reduction with lithium aluminum hydride of the cyclopropylamide of an aryloxy- or arylthioacetic acid. The compounds of this invention which possess a branched side chain are conveniently prepared by the reductive alkylation of the appropriate ketone and cyclopropylamine.

The intermediates employed in the preparation of the compounds of this invention are prepared by conventional methods from readily available or easily synthesized starting materials. Thus, for example the 2-aryloxyethyl and 2-arylthioethyl halides can be prepared from the corresponding phenols or thiophenols and 1,2-ethylene dihalides. The N-cyclopropylaryloxyacetamides and N-cyclopropylarylthioacetamides are prepared by reaction of the salts of the phenols or thiophenols with α-haloacetic acids, conversion of the resulting aryloxyacetic or arylthioacetic acids to the corresponding acid chlorides, and reaction of the acid chlorides with cyclopropylamine according to known procedures.

The required phenols and thiophenols are likewise prepared by well-known methods. Conveniently, these employ an appropriately substituted aniline which is transformed to its diazonium salt and thence converted by well-known procedures to the corresponding phenol or thiophenol.

The compounds of the present invention possess interesting and valuable physiological properties. Specifically, the claimed compounds have been found to affect the metabolism and level of the endogenous amines in the animal organism. They are, therefore, extremely valuable agents for the study and treatment of conditions in which the level of the said amines in the animal organism has been disturbed.

The practice of the invention will be better understood in the light of the preparations and examples which follow. It will be apparent to those skilled in the art that these are illustrative rather than limiting in nature.

PREPARATION OF INTERMEDIATES

Most of the phenols employed as intermediates in the preparation of the compounds of this invention are available from commercial sources. The others are prepared from readily available starting materials. Methods employed in the preparation of the latter are illustrated in the paragraphs which follow.

Preparation of 3-chloro-4-methylphenol

A cold solution of 41 g. of sodium nitrite in 100 ml. of water was added dropwise to a solution of 70.3 g. of 3-chloro-p-toluidine in aqueous sulfuric acid maintained at about 0–5° C. at a rate such that the temperature did not exceed 5° C. The cold solution of the diazonium salt so obtained was added portionwise to a boiling aqueous solution of sulfuric acid and the resulting mixture was stirred overnight. The reaction mixture was cooled and extracted with ether, and the ether extract was shaken with dilute sodium hydroxide solution to extract the phenol. The combined basic extracts were acidified and the 3-chloro-4-methylphenol was extracted from the acidified mixture with ether. The residue remaining after distillation of the ether was purified by distillation under reduced pressure to yield purified 3-chloro-4-methylphenol boiling at about 82° C. at about 0.5 mm.

Preparation of 3-methoxy-4-chlorophenol

A solution of 62 g. of 3-methoxyphenol in about 200 ml. of anhydrous ether was prepared and a catalytic amount of benzoyl peroxide was added. Dropwise addition of 67.5 g. of sulfuryl chloride was then begun. The reaction was exothermic, and the rate of addition was controlled so as to maintain the mixture at a gentle reflux. When the addition of sulfuryl chloride was completed, the reaction mixture was permitted to stand over the weekend at room temperature. The mixture was diluted with ether and added to cold water. The organic layer was washed with an aqueous sodium bicarbonate solution until evolution of carbon dioxide was no longer apparent. The ether layer was dried and the ether was removed in vacuo. The residue was distilled at reduced pressure to give 3-methoxy-4-chlorophenol boiling at about 111° C. at about 8 mm.

By employing the above procedure with 4-methoxyphenol, 2-chloro-4-methoxyphenol boiling at about 103–105° C. at about 8 mm. was obtained.

Preparation of 2-methyl-4-methoxyphenol

To a mixture of 100 ml. of concentrated hydrochloric acid in 100 g. of crushed ice were added 68.6 g. of 2-methyl-4-methoxyaniline. The mixture was cooled to about 0° C. and was maintained at that temperature while a cold solution of 36.8 g. of sodium nitrite in 85 ml. of water was added dropwise. The resulting diazonium solution was added dropwise to a boiling mixture of 150 g. of sodium sulfate, 108 ml. of concentrated sulfuric acid and 100 ml. of water in an apparatus which permitted the phenol to steam-distill from the mixture as it was formed. The addition of the diazonium solution was followed by the addition of 200 ml. of water to complete the distillation of the phenol. The distillate was extracted with ether and the combined ether extracts were washed with dilute aqueous sodium hydroxide. The basic extract was acidified and the product was extracted with ether. The ether layer was washed with water, dried, and evaporated to give a residue which was distilled at reduced pressure. The 2-methyl-4-methoxyphenol so obtained boiled at about 96° C. at about 0.2 mm.

*Preparation of 3,5-dimethoxyphenol*

Dry hydrogen chloride gas was bubbled into a solution of 94.5 g. of phloroglucinol in about 300 ml. of anhydrous methanol until the solution was saturated. The reaction mixture was heated under reflux overnight and was then cooled and extracted with ether. The product was extracted from the ether layer with dilute aqueous sodium hydroxide solution and the basic extract was acidified to liberate the phenol. The product was extracted with ether and, after drying and evaporation of the ether, the residue was distilled at reduced pressure. The 3,5-dimethoxyphenol so obtained boiled at about 124° C. at about 0.3 mm. The distilled product crystallized to give material melting at about 38–40° C.

*Preparation of 2-aryloxyethyl bromides*

A solution of 10 g. of sodium hydroxide in 200 ml. of water was prepared and placed into a 500 ml. round-bottom flask equipped with a stirrer and reflux condenser. To the solution were added 32 g. of 2-chlorophenol and 56.4 g. of 1,2-dibromoethane. The reaction mixture was stirred vigorously and heated under reflux conditions for six hours. The organic material was extracted with ether and the ether extracts were washed three times with dilute aqueous sodium hydroxide and twice with water. After drying over anhydrous calcium sulfate, the ether was removed in vacuo and the product was distilled at reduced pressure. The 2-(2-chlorophenoxy)ethyl bromide so obtained boiled at about 91–94° C. at about 0.07 mm.; $n_D^{25}$ 1.5661.

By employing the above-described procedure or modifications thereof, the following aryloxyethyl bromides were prepared from the indicated phenols:

2-(3-chlorophenoxy)ethyl bromide, B.P. about 89–93° C. at about 0.07 mm., from 3-chlorophenol.

2-(4-chlorophenoxy)ethyl bromide, B.P. about 89–92° C. at about 0.07 mm., M.P. about 30–35° C., from 4-chlorophenol.

2-(2-bromophenoxy)ethyl bromide, B.P. about 93–95° C. at about 0.05 mm., from 2-bromophenol.

2-(3-bromophenoxy)ethyl bromide, B.P. about 90–91° C. at about 0.06 mm., from 3-bromophenol.

2-(4-bromophenoxy)ethyl bromide, B.P. about 94–95° C. at about 0.07 mm., from 4-bromophenol.

2-(2,4-dichlorophenoxy)ethyl bromide, B.P. about 98–103° C. at about 0.06 mm., from 2,4-dichlorophenol.

2-(3,4-dichlorophenoxy)ethyl bromide, B.P. about 103° C. at about 0.2 mm., from 3,4-dichlorophenol.

2-(3,5-dichlorophenoxy)ethyl bromide, B.P. about 105° C. at about 0.1 mm., from 3,5-dichlorophenol.

2-(o-tolyloxy)ethyl bromide B.P. about 77–81° C. at about 0.5 mm., from o-cresol.

2-(m-tolyloxy)ethyl bromide, B.P. about 72–82° C. at about 0.2 mm., from m-cresol.

2-(m-tolyloxy)ethyl bromide, B.P. about 72–82° C. at about 1 mm., M.P. about 36–41° C., from p-cresol.

2(2,4-dimethylphenoxy)ethyl bromide, B.P. about 79–94° C. at about 0.04 mm., from 2,4-dimethylphenol.

2-(2-methyl-5-isopropylphenoxy)ethyl bromide, B.P. about 77–83° C. at about 0.2 mm., from 2-methyl-5-isopropylphenol.

2-(2-nitrophenoxy)ethyl bromide, B.P. about 127–130° C. at about 0.5 mm., from 2-nitrophenol.

2-(3-nitrophenoxy)ethyl bromide, B.P. about 131° C. at about 0.5 mm., from 3-nitrophenol.

2-(3-trifluoromethylphenoxy)ethyl bromide, B.P. about 62–66° C. at about 0.07 mm., from 3-trifluoromethylphenol.

2-($\alpha$-naphthyloxy)ethyl bromide from $\alpha$-naphthol.

2-($\beta$-naphthyloxy)ethyl bromide from $\beta$-naphthol.

*Preparation of aryloxyacetyl chlorides*

To a solution of 5.6 g. of sodium hydroxide in 100 ml. of water were added 11 g. of 2,3-dichlorophenol. When the addition of the phenol had been completed, 6.6 g. of monochloroacetic acid were added portionwise. The reaction mixture was then warmed to reflux temperature and refluxing was continued overnight. The mixture was poured onto ice and an excess of concentrated hydrochloric acid was added. The organic layer was extracted into ether, the combined ether extracts were washed with water, and, after being dried, the ether was evaporated in vacuo to yield crude, 2,3-dichlorophenoxyacetic acid. The crude acid was dissolved in chloroform and was heated at reflux while 16.5 g. of thionyl chloride were added dropwise. After refluxing for six hours, the chloroform and excess thionyl chloride were evaporated under vacuum and the residue was distilled at reduced pressure to give 2,3-dichlorophenoxyacetyl chloride boiling at about 83–90° C. at about 0.05 mm.

By employing the above procedure with the appropriately substituted phenol, the following aryloxyacetyl chlorides were obtained:

p-Fluorophenoxyacetyl chloride, B.P. about 75–94° C. at about 0.07 mm., from p-fluorophenol. The crude intermediate p-fluorophenoxyacetic acid melts at about 104–111° C.

2,5-dimethylphenoxyacetyl chloride, B.P. about 75–80° C. at about 0.07 mm., from 2,5-dimethylphenol. The crude intermediate acid melts at about 114–119° C.

3,5-dimethylphenoxyacetyl chloride, B.P. about 79–85° C. at about 0.1 mm., from 3,5-dimethylphenol. The intermediate acid melts at about 87–91° C.

2,6-dimethylphenoxyacetyl chloride, B.P. about 66–71° C. at about 0.05 mm., from 2,6-dimethylphenol. The intermediate 2,6-dimethylphenoxyacetic acid melts at about 140–144° C.

3,4-dimethylphenoxyacetyl chloride, B.P. about 87–93° C. at about 0.09 mm., from 3,4-dimethylphenol. The intermediate acid melts at about 163–166° C.

2-t-butylphenoxyacetyl chloride, B.P. about 86–90° C. at about 0.07 mm., from 2-t-butylphenol.

4-t-butylphenoxyacetyl chloride, B.P. about 89–92° C. at about 0.03 mm., from 4-t-butylphenol. The melting point of the intermediate acid is about 73–77° C.

2,4,5-trimethylphenoxyacetyl chloride, B.P. about 98–105° C. at about 0.06 mm., from 2,4,5-trimethylphenol. The intermediate 2,4,5-trimethylphenoxyacetic acid melts at about 133–135° C.

2,3,5-trimethylphenoxyacetyl chloride, B.P. about 93–96° C. at about 0.07 mm., from 2,3,5-trimethylphenol. The crude intermediate acid melts at about 115–120° C.

3,4,5-trimethylphenoxyacetyl chloride, B.P. about 106–111° C. at about 0.07 mm., from 3,4,5-trimethylphenol. The intermediate acid melts at about 145–149° C.

2,4,6-trimethylphenoxyacetyl chloride, B.P. about 108° C. at about 0.09 mm., from 2,4,6-trimethylphenol. The intermediate 2,4,6-trimethylphenoxyacetic acid melts at about 142–146° C.

2,4,6-trichlorophenoxyacetyl chloride, B.P. about 112–116° C. at about 0.04 mm., from 2,4,6-trichlorophenol. The crude intermediate acid melts at about 158–166° C.

2,6-dimethoxyphenoxyacetyl chloride, B.P. about 114–117° C. at about 0.03 mm., from 2,6-dimethoxyphenol. The intermediate acid melts at about 77–80° C.

3-methyl-4-chlorophenoxyacetyl chloride, B.P. about 96–104° C. at about 0.05 mm., from 3-methyl-4-chlorophenol. The intermediate acid melts at about 174–177° C.

2-methyl-4-chlorophenoxyacetyl chloride, B.P. 94–99° C at about 0.01 mm., from 2-methyl-4-chlorophenol.

2-chloro-4-methylphenoxyacetyl chloride, B.P. about 106–113° C. at about 0.07 mm., from 2-chloro-4-methylphenol. The crude intermediate acid melts at about 128–134° C.

2-chloro-3,4-dimehylphenoxyacetyl chloride, B.P. about 112–117° C. at about 0.06 mm., from 2-chloro-3,4-dimethylphenol.

3,5-dimethyl-4-chlorophenoxyacetyl chloride, B.P. about 95–101° C. at about 0.01 mm., from 3,5-dimethyl-4-chlorophenol. The crude intermediate acid melts at about 137–142° C.

By employing the above procedure with o-chlorophenol and α-chloropropionic acid, α-methyl-o-chlorophenoxyacetyl chloride is obtained.

*Preparation of N-cyclopropyl aryloxyacetamides*

To a solution of 5.7 g. of cyclopropylamine in 100 ml. of anhydrous benzene, 9.9 g. of 2,6-dimethylphenoxyacetyl chloride were added dropwise at room temperature with stirring. Stirring was continued at room temperature overnight. After being treated under reflux for about an hour, the reaction mixture was cooled and filtered to recover the precipitated cyclopropylamine hydrochloride. The precipitate was washed several times with hot benzene to dissolve the coprecipitated amide. The filtrate and benzene washes were diluted with ether and washed twice with dilute aqueous sodium hydroxide and once with water. The solution was dried and the solvents were evaporated in vacuo to give a solid residue comprising N - cyclopropyl - 2,6 - dimethylphenoxyacetamide melting at about 75–79° C.

The above procedure was employed with the appropriate aryloxyacetyl chloride in the preparation of the following N-cyclopropylaryloxyacetamides:

N - cyclopropyl - 3,4 - dimethylphenoxyacetamide, M.P. about 87–88° C., from 3,4-dimethylphenoxyacetyl chloride.

N - cyclopropyl - 2,5 - dimethylphenoxyacetamide, M.P. about 84–87° C., from 2,5-dimethylphenoxyacetyl chloride.

N - cyclopropyl - 3,5 - dimethylphenoxyacetamide, M.P. about 109–114° C., from 3,5-dimethylphenoxyacetyl chloride.

N-cyclopropyl-p-fluorophenoxyacetamide, M.P. about 66–70° C., from p-fluorophenoxyacetyl chloride.

N - cyclopropyl - 2,3 - dichlorophenoxyacetamide, M.P. about 109° C., from 2,3-dichlorophenoxyacetyl chloride.

N - cyclopropyl - 2,6 - dimethoxyphenoxyacetamide, M.P. about 85–90° C., from 2,6 - dimethoxyphenoxyacetyl chloride.

N - cyclopropyl - 2 - t - butylphenoxyacetamide, M.P. about 75–80° C., from 2-t-butylphenoxyacetyl chloride.

N - cyclopropyl - 4 - t - butylphenoxyacetamide, M.P. about 91–100° C., from 4-t-butylphenoxyacetyl chloride.

N - cyclopropyl - 2,4,5 - trimethylphenoxyacetamide, M.P. about 108–112° C., from 2,4,5-trimethylphenoxyacetyl chloride.

N - cyclopropyl - 2,3,5 - trimethylphenoxyacetamide, M.P. about 102–105° C., from 2,3,5 - trimethylphenoxyacetyl chloride.

N - cyclopropyl - 3,4,5 - trimethylphenoxyacetamide, M.P. about 85–89° C., from 3,4,5-trimethylphenoxyacetyl chloride.

N - cyclopropyl - 2,4,6 - trimethylphenoxyacetamide, M.P. about 74–79° C., from 2,4,6-trimethylphenoxyacetyl chloride.

N - cyclopropyl - 2,4,6 - trichlorophenoxyacetamide, M.P. about 99–106° C., from 2,4,6-trichlorophenoxyacetyl chloride.

N - cyclopropyl - 3 - methyl - 4 - chlorophenoxyacetamide, M.P. about 83–89° C., from 3-methyl-4-chlorophenoxyacetyl chloride.

N - cyclopropyl - 2 - methyl - 4 - chlorophenoxyacetamide, M.P. about 99–106° C., from 2-methyl-4-chlorophenoxyacetyl chloride.

N - cyclopropyl - 2 - chloro - 4 - methylphenoxyacetamide, M.P. about 96–102° C., from 2-chloro-4-methylphenoxyacetyl chloride.

N - cyclopropyl - 2 - chloro - 3,4 - dimethylphenoxyacetamide, M.P. about 55–65° C., from 2-chloro-3,4-dimethylphenoxyacetyl chloride.

N - cyclopropyl - 3,5 - dimethyl - 4 - chlorophenoxyacetamide, M.P. about 68–76° C., from 3,5-dimethyl-4-chlorophenoxyacetyl chloride.

N - cyclopropyl - α - methyl - o - chlorophenoxyacetamide, M.P. about 112–113° C., from α-methyl-o-chlorophenoxyacetyl chloride.

*Preparation of aryloxyacetones*

To a stirred mixture of 39 g. of potassium iodide and 40 g. of potassium carbonate in 500 ml. of reagent acetone were added 39 g. of 2-chloro-3,4-dimethylphenol. The mixture was heated to reflux temperature, 23.1 g. of chloroacetone were added in dropwise fashion, and refluxing was continued for an additional six hours. The reaction mixture was cooled and filtered to separate the solids. The acetone was evaporated in vacuo, and the residue was shaken with a mixture of ether and 10 percent aqueous sodium hydroxide solution. The organic layer was separated and was washed twice with dilute aqueous sodium hydroxide and once with water. After drying and evaporation of the solvent, the residue was distilled at reduced pressure to yield 2-chloro-3,4-dimethylphenoxyacetone boiling at about 100–105° C. at about 0.05 mm. The product crystallized upon standing and, after recrystallization from Skelly B, melted at about 43–45° C.

By employing the above-described procedure the following aryloxyacetones were also prepared:

2-chlorophenoxyacetone, B.P. 80–85° C. at about 0.5 mm., $n_D^{25}$ 1.5380, prepared from o-chlorophenol.

o-Tolyloxyacetone, B.P. about 75–80° C. at about 0.5 mm., $n_D^{25}$ 1.5187, from o-cresol.

2,4-dichlorophenoxyacetone, B.P. about 100–105° C. at about 0.07 mm., from 2,4-dichlorophenol.

*Preparation of arylthiophenols*

The required thiophenols were prepared from the corresponding anilines by diazotization and reaction with potassium ethyl xanthate. A typical procedure is that given below for the preparation of 3-chloro-4-methylthiophenol.

To a mixture of 200 ml. of concentrated hydrochloric acid and 200 g. of crushed ice were added dropwise 141.6 g. of 3-chloro-p-toluidine. The solution was cooled to 0° C. by means of an acetone-Dry Ice bath and then a cold solution of 73.5 g. of sodium nitrite in 167 ml. of water was added dropwise at a rate such that the temperature was maintained between about 0 and 4° C. The cold diazonium solution so obtained was added dropwise to a solution of 187 g. of potassium ethyl xanthate in 240 ml. of water maintained between about 45 and 50° C. After being stirred overnight, the reaction mixture was poured onto crushed ice in a separatory funnel and the organic layer was separated. The aqueous layer was washed thoroughly with ether, and the ether washings were added to the organic layer previously separated. The combined organic layers were washed with 10 percent aqueous sodium hydroxide solution and then with water until the washings were neutral. The organic solution was dried and the solvents evaporated at reduced pressure. The crude residue was added to about 670 ml. of ethanol, heated to reflux temperature and treated with 243 g. of potassium hydroxide pellets at a rate such that the solution was kept boiling. Refluxing was continued until a test sample was found to be completely soluble in water. The reaction mixture was then diluted with water and extracted with ether. The ether extract was in turn extracted with dilute aqueous sodium hydroxide. The combined aqueous phases were acidified to liberate the thiophenol, the product was extracted with ether, and after drying and removal of the solvent in vacuo, the 3-chloro-4-methylthiophenol was obtained as a fraction boiling at about 100° C. at about 8 mm.

Among the thiophenols prepared by the above-described procedure are the following:

3-bromothiophenol, B.P. about 98–100° C. at about 8 mm., from 3-bromoaniline.

2,3-dichlorothiophenol, B.P. about 100° C. at about 8 mm., from 2,3-dichloroaniline.

3,5-dichlorothiophenol, B.P. about 114° C. at about 8 mm., from 3,5-dichloroaniline.

2,5-dichlorothiophenol, B.P. about 109.5° C. at about 8 mm., from 2,5-dichloroaniline.

3,4-dichlorothiophenol, B.P. about 115° C. at about 8 mm., from 3,4-dichloroaniline.

2,4-dichlorothiophenol, B.P. about 115° C. at about 8 mm., from 2,4-dichloroaniline.

2,3-dimethylthiophenol, B.P. about 93.5° C. at about 8 mm., from 2,3-dimethylaniline.

2,4-dimethylthiophenol, B.P. about 85° C. at about 8 mm., from 2,4-dimethylaniline.

3,4-dimethylthiophenol, B.P. about 89° C. at about 8 mm., from 3,4-dimethylaniline.

2,6-dimethylthiophenol, B.P. about 89° C. at about 8 mm., from 2,6-dimethylaniline.

3-trifluoromethylthiophenol, B.P. about 56° C. at about 8 mm., from 3-trifluoromethylaniline.

4-trifluoromethylthiophenol, B.P. about 57° C. at about 8 mm., from 4-trifluoromethylaniline.

2-methoxythiophenol, B.P. about 99° C. at about 8 mm., from 2-methoxyaniline.

4-methoxythiophenol, B.P. about 100° C. at about 8 mm., from 4-methoxyaniline.

2,4-dimethoxythiophenol, B.P. about 142° C. at about 8 mm., from 2,4-dimethoxyaniline.

2,5-dimethoxythiophenol, B.P. about 131° C. at about 8 mm., from 2,5-dimethoxyaniline.

3,4-dimethoxythiophenol, B.P. about 142° C. at about 8 mm., from 3,4-dimethoxyaniline.

2-chloro-5-trifluoromethylthiophenol, B.P. about 75° C. at about 8 mm., from 2-chloro-5-trifluoromethylaniline.

2-trifluoromethyl-4-chlorothiophenol, B.P. about 75° C. at about 8 mm., from 2-trifluoromethyl-4-chloroaniline.

3-trifluoromethyl-4-chlorothiophenol, B.P. about 83.5° C. at about 8 mm., from 3-trifluoromethyl-4-chloroaniline.

2-trifluoromethyl-4-methoxythiophenol, B.P. about 96–97° C. at about 8 mm., from 2-trifluoromethyl-4-methoxyaniline.

2-chloro-4-methylthiophenol, B.P. about 98° C. at about 8 mm., from 2-chloro-4-methylaniline.

2-chloro-6-methylthiophenol, B.P. about 99° C. at about 8 mm., from 2-chloro-6-methylaniline.

2-methyl-5-chlorothiophenol, B.P. about 100° C. at about 8 mm., from 2-methyl-5-chloroaniline.

4-chloro-2,5-dimethoxythiophenol, B.P. about 155° C. at about 8 mm., from 4-chloro-2,5-dimethoxyaniline.

2-methyl-3-chlorothiophenol, from 2-methyl-3-chloroaniline.

2-methyl-4-chlorothiophenol, B.P. about 98.5° C. at about 8 mm., from 2-methyl-4-chloroaniline.

5-chloro-2,4-dimethoxythiophenol, B.P. about 118° C. at about 0.08 mm., from 3-chloro-2,4-dimethoxyaniline.

*Preparation of N-cyclopropylarylthioacetamides*

The N-cyclopropylarylthioacetamides were prepared by the procedure described above for the preparation of the analogous N-cyclopropylaryloxyacetamides. Among the compounds so prepared were the following:

N-cyclopropylphenylthioacetamide, M.P. about 110–112° C. Analysis—Calc.: C, 57.50; H, 7.01. Found: C, 57.48; H, 7.23.

N - cyclopropyl - o - chlorophenylthioacetamide, M.P. about 115–117° C. Analysis—Calc.: C, 54.65; H, 5.00. Found: C, 54.84; H, 5.19.

N - cyclopropyl - p - chlorophenylthioacetamide, M.P. about 110–112° C.

N - cyclopropyl - o - bromophenylthioacetamide, M.P. about 108–111° C.

N-cyclopropyl - 2,3 - dichlorophenylthioacetamide, M.P. about 130° C.

N-cyclopropyl-2,5-dichlorophenylthioacetamide.

N-cyclopropyl - 3,4 - dichlorophenylthioacetamide, M.P. about 89–94° C.

N-cyclopropyl-o-tolylthioacetamide, M.P. about 102–103° C.

N-cyclopropyl-m-tolylthioacetamide, M.P. about 93–95° C.

N-cyclopropyl-p-tolylthioacetamide, M.P. about 97–98° C.

N - cyclopropyl-2,3-dimethylphenylthioacetamide, M.P. about 95–99° C.

N-cyclopropyl-2,6-dimethylphenylthioacetamide.

N - cyclopropyl-2-chloro-4-methylphenylthioacetamide, M.P. about 114–116° C.

N - cyclopropyl-3-chloro-4-methylphenylthioacetamide, M.P. about 70–72° C.

N - cyclopropyl-2-chloro-6-methylphenylthioacetamide, M.P. about 99–107° C.

N - cyclopropyl-2-methyl-5-chlorophenylthioacetamide, M.P. about 117–120° C

N - cyclopropyl-2-methyl-4-chlorophenylthioacetamide, M.P. about 124–128° C.

N - cyclopropyl-2-methyl-3-chlorophenylthioacetamide, B.P. about 96–97° C. at about 0.07 mm.

*Preparation of 2-arylthioethyl bromides*

By employing the procedure described above for the preparation of 2-aryloxyethyl bromides, the following intermediate 2-arylthioethyl bromides were prepared:

2-phenylthioethyl bromide
2-(3-bromophenylthio)ethyl bromide
2-(3,5-dichlorophenylthio)ethyl bromide
2-(2,4-dichlorophenylthio)ethyl bromide
2-(2,4-dimethylphenylthio)ethyl bromide
2-(3,4-dimethylphenylthio)ethyl bromide
2-(3-trifluoromethylphenylthio)ethyl bromide
2-(4-trifluoromethylphenylthio)ethyl bromide
2-(2-methoxyphenylthio)ethyl bromide
2-(4-methoxyphenylthio)ethyl bromide
2-(2,4-dimethoxyphenylthio)ethyl bromide
2-(2,5-dimethoxyphenylthio)ethyl bromide
2-(3,4-dimethoxyphenylthio)ethyl bromide
2-(3,5-dimethoxyphenylthio)ethyl bromide
2-(2-chloro-5-trifluoromethylphenylthio)ethyl bromide
2-(2-trifluoromethyl-4-chlorophenylthio)ethyl bromide
2-(3-trifluoromethyl-4-chlorophenylthio)ethyl bromide
2-(2-trifluoromethyl-4-methoxyphenylthio)ethyl bromide
2-(3-chloro-2,4-dimethoxyphenylthio)ethyl bromide
2-(4-chloro-2,5-dimethoxyphenylthio)ethyl bromide
2-(α-naphthylthio)ethyl bromide
2-(β-naphthylthio)ethyl bromide

EXAMPLE 1

To a solution of 10 g. of cyclopropylamine in 20 ml. of dimethylformamide were added 5 g. of 2-(3-chlorophenoxy)ethyl bromide. The reaction mixture was warmed overnight on the steambath. The mixture was cooled, and the product was extracted with dilute aqueous hydrochloric acid. The combined acid extracts were washed with ether and made basic to liberate the product. The product was extracted with ether and the combined ether extracts were washed with water and dried. The ether was removed in vacuo and the residue was distilled under reduced pressure. The hydrochloride of the N-[2-(3-chlorophenoxy)ethyl]cyclopropylamine so obtained was prepared with anhydrous hydrogen chloride and was recrystallized from a mixture of ethanol and ether to give a product melting at about 151–154° C. Analysis—Calc.: C, 52.42; H, 6.09. Found: C, 53.00; H, 6.24.

By employing the appropriate 2-aryloxyethyl bromide in the procedure described above, or a modification thereof, the following substituted cyclopropylamine salts were prepared:

N-[2-(2-chlorophenoxy)ethyl]cyclopropylamine hydrochloride, M.P. about 117–119° C., from 2-(2-chlorophenoxy)ethyl bromide. Analysis—Calc.: Cl, 28.58; N, 5.64. Found: Cl, 28.78; N, 5.73.

N-[2-(4-chlorophenoxy)ethyl]cyclopropylamine hydrochloride, M.P. about 167–170° C., from 2-(4-chlorophenoxy)ethyl bromide. Analysis—Calc.: C, 53.24; H, 6.09. Found: C, 53.48; H, 6.19.

N-[2-(2-bromophenoxy)ethyl]cyclopropylamine hydrochloride, M.P. about 129–131° C., from 2-(2-bromophenoxy)ethyl bromide. Analysis—Calc.: C, 45.15; H, 5.16. Found: C, 45.38; H, 5.38.

N-[2-(3-bromophenoxy)ethyl]cyclopropylamine hydrochloride, M.P. about 119–121° C., from 2-(3-bromophenoxy)ethyl bromide. Analysis—Calc.: C, 45.15; H, 5.16. Found: C, 44.41; H, 5.51.

N-[2-(4-bromophenoxy)ethyl]cyclopropylamine hydrochloride, M.P. about 168–171° C., from 2-(4-bromophenoxy)ethyl bromide. Analysis—Calc.: C, 45.15; H, 5.16. Found: C, 44.53; H, 5.35.

N-[2-(2,4-dichlorophenoxy)ethyl]cyclopropylamine hydrochloride, M.P. about 159–163° C., from 2-(2,4-dichlorophenoxy)ethyl bromide. Analysis—Calc.: C, 46.75; H, 4.99. Found: C, 46.94; H, 5.22.

N-[2-(2,5-dichlorophenoxy)ethyl]cyclopropylamine hydrochloride, M.P. about 171–172° C., from 2-(2,5-dichlorophenoxy)ethyl bromide. Analysis—Calc.: C, 46.75; H, 4.99. Found: C, 47.01; H, 5.09.

N-[2-(2,3-dichlorophenoxy)ethyl]cyclopropylamine hydrochloride, M.P. about 160–161° C., from 2-(2,3-dichlorophenoxy)ethyl bromide. Analysis—Calc.: C, 46.75; H, 4.99. Found: C, 47.03; H, 5.28.

N-[2-(3,4-dichlorophenoxy)ethyl]cyclopropylamine hydrochloride, M.P. about 169–170° C., from 2-(3,4-dichlorophenoxy)ethyl bromide. Analysis—Calc.: C, 46.75; H, 4.99. Found: C, 46.77; H, 5.11.

N-[2-(3,5-dichlorophenoxy)ethyl]cyclopropylamine hydrochloride, M.P. about 173–175° C., from 2-(3,5-dichlorophenoxy)ethyl bromide. Analysis—Calc.: C, 46.75; H, 4.99. Found: C, 46.69; H, 5.14.

N-[2-(o-tolyloxy)ethyl]cyclopropylamine hydrochloride, M.P. about 204–206° C., from 2-(o-tolyloxy)ethyl bromide.

N-[2-(m-tolyloxy)ethyl]cyclopropylamine hydrochloride, M.P. about 132–133° C., from 2-(m-tolyloxy)ethyl bromide. Analysis—Calc.: C, 63.28; H, 7.96. Found: C, 63.03; H, 8.07.

N-[2-(p-tolyloxy)ethyl]cyclopropylamine hydrochloride, M.P. about 171–172° C., from 2-(p-tolyloxy)ethyl bromide. Analysis—Calc.: C, 63.28; H, 7.96. Found: C, 64.26; H, 8.05.

N-[2 - (2,3 - dimethylphenoxy)ethyl]cyclopropylamine hydrochloride, M.P. about 167.5–169° C., from 2-(2,3-dimethylphenoxy)ethyl bromide. Analysis—Calc.: C, 64.58; H, 8.33. Found: C, 64.66; H, 8.54.

N- [2 - (2,4 - dimethylphenoxy)ethyl]cyclopropylamine hydrochloride, M.P. about 144–146° C., from 2-(2,4-dimethylphenoxy)ethyl bromide.

N-[2-(2-methyl-5-isopropylphenoxy)ethyl]cyclopropylamine hydrochloride, M.P. about 190–192° C., from 2-(2-methyl-5-isopropylphenoxy)ethyl bromide. Analysis—Calc.: C, 66.77; H, 8.96. Found: C, 67.09; H, 8.92.

N-[2-(2-nitrophenoxy)ethyl]cyclopropylamine hydrochloride, M.P. about 128–130° C., from 2-(2-nitrophenoxy)ethyl bromide. Analysis—Calc.: C, 51.07; H, 5.84. Found: C, 51.20; H, 5.83.

N-[2-(3-nitrophenoxy)ethyl]cyclopropylamine hydrochloride, M.P. about 180–182° C., from 2-(3-nitrophenoxy)ethyl bromide. Analysis—Calc.: C, 51.07; H, 5.84. Found: C, 51.29; H, 5.99.

N - [2 - (3 - trifluoromethylphenoxy)ethyl]cyclopropylamine hydrochloride, M.P. about 161–163° C., from 2-(3-trifluoromethylphenoxy)ethyl bromide. Analysis—Calc.: C, 51.16; H, 5.36. Found: C, 51.30; H, 5.39.

N-[2 - (α-naphthyloxy)ethyl]cyclopropylamine hydrochloride, M.P. about 242–244° C.

N - [2-(β-naphthyloxy)ethyl]cyclopropylamine hydrochloride, M.P. about 247–248° C.

EXAMPLE 2

A solution of 9.9 g. of N-cyclopropyl-2,6-dimethylphenoxyacetamide in 100 ml. of anhydrous benzene was added dropwise to a stirred mixture of 3.8 g. of lithium aluminum hydride in 100 ml. of anhydrous ether. After being stirred overnight, the reaction mixture was decomposed by adding successively 4 ml. of water, 3 ml. of 20 percent aqueous sodium hydroxide solution, and 14 ml. of water. The decomposed reaction mixture was filtered and the solid was washed on the funnel with ether. The filtrate was extracted with dilute aqueous hydrochloric acid and the combined acid extracts were made basic by the addition of excess aqueous sodium hydroxide solution. The product was extracted with ether and the ether extract was washed with water. The ether solution containing the amine was dried and the solvent evaporated in vacuo to yield N-[2-(2,6-dimethylphenoxy)ethyl]cyclopropylamine, the hydrochloride of which melts at about 152–154° C. Analysis—Calc.: C, 64.58; H, 8.33. Found: C, 64.76; H, 8.52.

By employing the above procedure or a modification thereof in which the appropriate amide was added as a solution in anhydrous ether, the following amines were prepared and purified as their hydrochloride salts:

N-[2 - (3,4 - dimethylphenoxy)ethyl]cyclopropylamine hydrochloride, M.P. about 145–147° C., from N-cyclopropyl-3,4-dimethylphenoxyacetamide. Analysis—Calc.: C, 64.58; H, 8.33. Found: C, 64.71; H, 8.59.

N - [2-(2,5-dimethylphenoxy)ethyl]cyclopropylamine hydrochloride, M.P. about 135–137° C., from N-cyclopropyl - 2,5 - dimethylphenoxyacetamide. Analysis—Calc.: C, 64.58; H, 8.33. Found: C, 64.54; H, 8.39.

N - [2 - (3,5-dimethylphenoxy)ethyl]cyclopropylamine hydrochloride, M.P. about 134–136° C., from N-cyclopropyl - 3,5 - dimethylphenoxyacetamide. Analysis—Calc.: C, 64.58; H, 8.33. Found: C, 64.28; H, 8.57.

N - [2 - (4-fluorophenoxy)ethyl]cyclopropylamine hydrochloride, M.P. about 161–163° C., from N-cyclopropyl - 4-fluorophenoxyacetamide. Analysis—Calc.: C, 57.02; H, 6.52. Found: C, 57.48; H, 6.54.

N - [2 - (2,3-dichlorophenoxy)ethyl]cyclopropylamine hydrochloride, M.P. about 160–161° C., from N-cyclopropyl - 2,3 - dichlorophenoxyacetamide. Analysis—Calc.: C, 46.75; H, 4.99. Found: C, 47.03; H, 5.28.

N - [2-(2,6-dimehoxyphenoxy)ethyl]cyclopropylamine hydrochloride, M.P. about 120–122° C., from N-cyclopropyl - 2,6-dimethoxyphenoxyacetamide. Analysis—Calc.: C, 57.03; H, 7.36. Found: C, 57.06; H, 7.50.

N - [2 - (2 - t-butylphenoxy)ethyl]cyclopropylamine hydrochloride, M.P. about 161–164° C., from N-cyclopropyl - 2 - t - butylphenoxyacetamide. Analysis—Calc.: C, 66.77; H, 8.96. Found: C, 67.21; H, 9.62.

N - [2 - (4 - t-butylphenoxy)ethyl]cyclopropylamine hydrochloride, M.P. about 165–166° C., from N-cyclopropyl - 4-t-butylphenoxyacetamide. Analysis—Calc.: C, 66.77; H, 8.96. Found: C, 66.70; H, 9.10.

N - [2-(2,4,5-trimethylphenoxy)ethyl]cyclopropylamine hydrochloride, M.P. about 178–179° C., from N-cyclopropyl - 2,4,5-trimethylphenoxyactamide. Analysis—Calc.: C, 65.73; H, 8.66. Found: C, 65.45; H, 8.47.

N - [2 - (2,3,5-trimethylphenoxy)ethyl]cyclopropylamine hydrochloride, M.P. about 159–160° C., from N-cyclopropyl - 2,3,5 - trimethylphenoxyacetamide. Analysis—Calc.: C, 65.73; H, 8.66. Found: C, 65.66; H, 8.51.

N - [2 - (3,4,5-trimethylphenoxy)ethyl]cyclopropylamine hydrochloride, M.P. about 165–166° C., from N-cyclopropyl - 3,4,5 - trimethylphenoxyacetamide. Analysis—Calc.: C, 65.73; H, 8.66. Found: C, 66.25; H, 9.21.

N - [2 - (2,4,6-trimethylphenoxy)ethyl]cyclopropylamine hydrochloride, M.P. about 203–204° C., from N - cyclopropyl-2,4,6-trimethylphenoxyacetamide. Analysis—Calc.: C, 65.73; H, 8.66. Found: C, 65.62; H, 8.78.

N - [2-(2,4,6-trichlorophenoxy)ethyl]cyclopropylamine hydrochloride, M.P. about 166–169° C., from N-cyclopropyl-2,4,6-trichlorophenoxyacetamide.

N - [2-(2-methyl-4-chlorophenoxy)ethyl]cyclopropylamine hydrochloride, M.P. about 161–162° C., from N-cyclopropyl-2-methyl-4-chlorophenoxyacetamide. Analysis—Calc.: C, 54.97; H, 6.53. Found: C, 55.95; H, 7.09.

N - [2-(3-methyl-4-chlorophenoxy)ethyl]cyclopropylamine hydrochloride, M.P. about 168–169° C., from N-cyclopropyl - 3-methyl-4-chlorophenoxyacetamide. Analysis—Calc.: C, 54.97; H, 6.53. Found: C, 55.19; H, 6.77.

N - [2-(2-chloro-4-methylphenoxy)ethyl]cyclopropylamine hydrochloride, M.P. about 134–135° C., from N-cyclopropyl-2-chloro-4-methylphenoxyacetamide. Analysis—Calc.: C, 54.97; H, 6.53. Found: C, 55.20; H, 6.59.

N - [2 - (2-chloro-3,4-dimethylphenoxy)ethyl]cyclopropylamine from N-cyclopropyl-2-chloro-3,4-dimethylphenoxyacetamide, purified by distillation of the free base; B.P. about 106–115° C. at about 0.05 mm.

N - [2-(4-chloro-3,5-dimethylphenoxy)ethyl]cyclopropylamine from N-cyclopropyl-4-chloro-3,5-dimethylphenoxyacetamide, purified as the free base; B.P. about 109–116° C. at about 0.01 mm. The hydrochloride melts at about 166–169° C. Analysis—Calc.: C, 56.53; H, 6.93. Found: 56.68; H, 7.06.

EXAMPLE 3

A solution of 9.2 g. of 2-chlorophenoxyacetone and 3 g. of cyclopropylamine in about 200 ml. of ethanol containing about 0.5 g. of platinum oxide was shaken on a Parr hydrogenator until the theoretical quantity of hydrogen had been taken up. The reaction mixture was filtered to remove the catalyst and the solvent was removed in vacuo. The residue was dissolved in ether and the ether solution was extracted with dilute aqueous hydrochloric acid. The combined acid extracts were made basic with dilute aqueous sodium hydroxide solution and the free base was extracted with ether. The ether solution was dried and the drying agent was removed by filtration. Dry hydrogen chloride gas was passed into the solution to precipitate N-[1-methyl-2-(2-chlorophenoxy)ethyl]cyclopropylamine hydrochloride melting at about 135–137° C. after recrystallization from a mixture of ethanol and ether. Analysis—Calc.: C, 54.97; H, 6.53. Found: C, 55.11; H, 6.56.

By employing the same procedure with appropriately substituted aryloxyacetones, the following cyclopropylamines were prepared and purified as the hydrochloride salts:

N-[1-methyl - 2 - (o-tolyloxy)ethyl]cyclopropylamine hydrochloride, M.P. about 150–151° C., from o-tolyloxyacetone. Analysis—Calc.: C, 64.58; H, 8.33. Found: C, 64.56; H, 8.49.

N-(1-methyl - 2 - phenoxyethyl)cyclopropylamine hydrochloride, M.P. about 175–176° C., from phenoxyacetone.

N-[1-methyl-2-(2-chloro - 3,4 - dimethylphenoxy)ethyl]cyclopropylamine hydrochloride, M.P. about 178–180° C., from (2-chloro-3,4-dimethylphenoxy)acetone. Analysis—Calc.: C, 57.93; H, 7.29. Found: C, 57.69; H, 7.28.

N - [1 - methyl - 2 - (2,4 - dichlorophenoxy)ethyl]cyclopropylamine hydrochloride, M.P. about 151–152.5° C., from 2,4-dichlorophenoxyacetone. Analysis—Calc.: C, 48.59; H, 5.43. Found: C, 49.01; H, 5.66.

EXAMPLE 4

By employing the procedure described in Example 1 with the appropriate arylthioethyl bromide, the N-(arylthioethyl)cyclopropylamines listed below were prepared. The amine in each case was purified as the hydrochloride salt.

N-[2 - (phenylthio)ethyl]cyclopropylamine hydrochloride, M.P. about 110–112° C. Analysis—Calc.: C, 57.50; H, 7.01. Found: C, 57.48; H, 7.23.

N-[2-(2,3 - dichlorophenylthio)ethyl]cyclopropylamine hydrochloride, M.P. about 183–184° C. Analysis—Calc.: C, 44.23; H, 4.72. Found: C, 44.18; H, 4.93.

N - [2 - (3,5 - dichlorophenylthio)ethyl]cyclopropylamine hydrochloride, M.P. about 167–169° C. Analysis—Calc.: C, 44.23; H, 4.72. Found: C, 44.48; H, 4.91.

N - [2 - (2,4 - dimethylphenylthio)ethyl]cyclopropylamine hydrochloride, M.P. about 96–99° C. Analysis—Calc.: C, 60.56; H, 7.81. Found: C, 60.35; H, 7.71.

N - [2 - (3,4 - dimethylphenylthio)ethyl]cyclopropylamine hydrochloride, M.P. about 119–122° C. Analysis—Calc.: C, 60.56; H, 7.81. Found: C, 60.70; H, 7.48.

N - [2 - (3 - trifluoromethylphenylthio)ethyl]cyclopropylamine hydrochloride, M.P. about 103–106° C. Analysis—Calc.: C, 48.40; H, 5.07. Found: C, 48.48; H, 5.15.

N - [2 - (4 - trifluoromethylphenylthio)ethyl]cyclopropylamine hydrochloride, M.P. about 138–140° C. Analysis—Calc.: C, 48.40; H, 5.07. Found: C, 48.65; H, 5.17.

N - [2 - (2-methoxyphenylthio)ethyl]cyclopropylamine hydrochloride, M.P. about 112–114° C. Analysis—Calc.: C, 55.47; H, 6.98. Found: C, 55.75; H, 7.19.

N - [2 - (4-methoxyphenylthio)ethyl]cyclopropylamine hydrochloride, M.P. about 90–91° C. Analysis—Calc.: C, 55.47; H, 6.98. Found: C, 55.51; H, 6.99.

N - [2 - (2,4 - dimethoxyphenylthio)ethyl]cyclopropylamine hydrochloride, M.P. about 163–165° C. Analysis—Calc.: C, 53.87; H, 6.95. Found: C, 53.80; H, 7.18.

N - [2 - (2,5 - dimethoxyphenylthio)ethyl]cyclopropylamine hydrochloride, M.P. about 112–114° C. Analysis—Calc.: C, 53.87; H, 6.95. Found: C, 54.17; H, 7.10.

N - [2 - (3,4-dimethoxyphenylthio)ethyl]cyclopropylamine hydrochloride, M.P. about 111–114° C. Analysis—Calc.: C, 53.87; H, 6.95. Found: C, 54.36; H, 6.55.

N - [2 - (3,5 - dimethoxyphenylthio)ethyl]cyclopropylamine hydrochloride, M.P. about 115–117° C. Analysis—Calc.: C, 53.87; H, 6.95. Found: C, 53.87; H, 7.08.

N - [2 - (2 - chloro-5-trifluoromethylphenylthio)ethyl]cyclopropylamine hydrochloride, M. P. about 129–131° C. Analysis—Calc.: C, 43.38; H, 4.24. Found: C, 43.60; H, 4.41.

N - [2 - (2 - trifluoromethyl-4-chlorophenylthio)ethyl]cyclopropylamine hydrochloride, M.P. about 108–110° C. Analysis—Calc.: C, 43.38; H, 4.24. Found: C, 43.60; H, 4.15.

N - [2 - (3 - trifluoromethyl - 4 - chlorophenylthio)ethyl]cyclopropylamine hydrochloride, M.P. about 148–150° C. Analysis—Calc.: C, 43.38; H, 4.24. Found: C, 43.66; H, 4.47.

N - [2 - (2 - trifluoromethyl - 4 - methoxyphenylthio)ethyl]cyclopropylamine hydrochloride, M.P. about 125–128° C. Analysis—Calc.: C, 47.63; H, 5.22. Found: C, 47.57; H, 5.16.

N - [2 - (3 - chloro-2,4-dimethoxyphenylthio)ethyl]cyclopropylamine hydrochloride, M.P. about 173–174° C.

Analysis—Calc.: C, 48.15; H, 5.90. Found: C, 47.95; H, 5.86.

N - [2 - (4 - chloro-2,5-dimethoxyphenylthio)ethyl] cyclopropylamine hydrochloride, M.P. about 200–201° C. Analysis—Calc.: C, 48.15; H, 5.90. Found: C, 48.33; H, 5.95.

N - [2 - (α-naphthylthio)ethyl]cyclopropylamine hydrochloride, M.P. about 134.5–135.5° C. Analysis—Calc.: C, 64.38; H, 6.48. Found: C, 64.38; H, 6.72.

N - [2 - (β-naphthylthio)ethyl]cyclopropylamine hydrochloride, M.P. about 124–125.5° C. Analysis—Calc.: C, 64.38; H, 6.48. Found: C, 64.12; H, 6.65.

EXAMPLE 5

By employing the procedure described in Example 2 with the appropriate N-cyclopropylarylthioacetamide, the following N-arylthioethylcyclopropylamines were obtained as the hydrochlorides:

N-[2-(2-chlorophenylthio)ethyl]cyclopropylamine hydrochloride, M.P. about 85–87° C. Analysis—Calc.: C, 50.00; H, 5.72. Found: C, 50.20; H, 5.93.

N-[2-(4-chlorophenylthio)ethyl]cyclopropylamine hydrochloride, M.P. about 108–110° C. Analysis—Calc.: C, 50.00; H, 5.72. Found: C, 49.89; H, 6.11.

N-[2-(2-bromophenylthio)ethyl]cyclopropylamine hydrochloride, M.P. about 89–92° C. Analysis—Calc.: C, 42.80; H, 4.89. Found: C, 43.36; H, 5.16.

N - [2-(2,3-dichlorophenylthio)ethyl]cyclopropylamine hydrochloride, M.P. about 183–184° C. Analysis—Calc.: C, 44.23; H, 4.72. Found: C, 44.18; H, 4.93.

N - [2-(2,5-dichlorophenylthio)ethyl]cyclopropylamine hydrochloride, M.P. about 129–130° C. Analysis—Calc.: C, 44.23; H, 4.72. Found: C, 44.39; H, 4.84.

N -[2-(3,4-dichlorophenylthio)ethyl]cyclopropylamine hydrochloride, M.P. about 120–123° C. Analysis—Calc.: C, 44.23; H, 4.72. Found: C, 44.22; H, 4.96.

N-[2 - (2,4-dichlorophenylthio)ethyl]cyclopropylamine hydrochloride, M.P. about 122–124° C. Analysis—Calc.: C, 44.23; H, 4.72; N, 4.69. Found: C, 44.35; H, 4.89; N, 4.58.

N-[2-(o-tolylthoio)ethyl]cyclopropylamine hydrochloride, M.P. about 118–120° C. Analysis—Calc.: C, 59.11; H, 7.44. Found: C, 59.31; H, 7.70.

N-[2-(m-tolylthio)ethyl]cyclopropylamine hydrochloride, M.P. about 70–72° C. Analysis—Calc.: C, 59.11; H, 7.44. Found: C, 58.85; H, 7.52.

N-[2-(p-tolylthio)ethyl]cyclopropylamine hydrochloride, M.P. about 124–125° C. Analysis—Calc.: C, 59.11; H, 7.44. Found: C, 58.82; H, 7.61.

N-[2-(2,3-dimethylphenylthio)ethyl]cyclopropylamine hydrochloride, M.P. about 146–147° C. Analysis—Calc.: C, 60.56; H, 7.81. Found: C, 60.82; H, 8.01.

N-[2-(2,6-dimethylphenylthio)ethyl]cyclopropylamine hydrochloride, M.P. about 170–172° C. Analysis—Calc.: C, 60.56; H, 7.81. Found: C, 60.82; H, 8.02.

N-[2-(2-chloro-4-methylphenylthio)ethyl]cyclopropylamine hydrochloride, M.P. about 90–93° C.

N-[2-(3-chloro-4-methylphenylthio)ethyl]cyclopropylamine hydrochloride, M.P. about 119–122° C. Analysis—Calc.: C, 50.80; H, 6.15. Found: C, 51.77; H, 6.42.

N - [2-(2-chloro-6-methylphenylthio)ethyl]cyclopropyamine hydrochloride, M.P. about 175–178° C. Analysis—Calc.: C, 51.80; H, 6.15. Found: C, 52.06; H, 6.43.

N - [2 - (2-methyl-5-chlorophenylthio)ethyl]cyclopropylamine hydrochloride, M.P. about 92–95° C. Analysis—Calc.: C, 51.80; H, 6.15. Found: C, 51.87; H, 6.34.

N - [2 - (2-methyl-3-chlorophenylthio)ethyl]cyclopropylamine hydrochloride, M.P. about 175–176° C. Analysis—Calc.: C, 51.80; H, 6.15. Found: C, 51.47; H, 6.20.

N - [2 - (2-methyl-4-chlorophenylthio)ethyl]cyclopropylamine hydrochloride, M.P. about 124–126° C.

EXAMPLE 6

A mixture of 5 g. of N-[2-(2-chlorophenoxy)ethyl] cyclopropylamine, 25 g. of 37 percent aqueous formaldehyde solution and 100 ml. of 90 percent formic acid was heated under reflux overnight. The reaction mixture was evaporated to dryness in vacuo and the residue was made basic by the addition of dilute aqueous sodium hydroxide solution. The free base was taken up in ether and the ether solution was washed with water and dried. Treatment of the dried ether solution with anhydrous hydrogen chloride precipitated N-methyl-N-[2-(2-chlorophenoxy)-ethyl]cyclopropylamine hydrochloride which, after recrystallization, melted at about 131–135° C. Analysis—Calc.: C, 54.97; H, 6.54. Found: C, 55.18; H, 6.68.

By an analogous procedure, the following compounds were prepared:

N - methyl - N-[2-(2-chlorophenylthio)ethyl]cyclopropylamine hydrochloride, M.P. about 159–160° C., from N-[2-(2-chlorophenylthio)ethyl]cyclopropylamine. Analysis—Calc.: C, 46.09; H, 5.15. Found: C, 46.07; H, 5.36.

N - methyl-N-[2-(3,4-dimethylphenylthio)ethyl]cyclopropylamine hydrochloride, M.P. about 99–103° C., from N - [2-(3,4-dimethylphenylthio)ethyl]cyclopropylamine. Analysis—Calc.: C, 61.88; H, 8.15. Found: C, 61.92; H, 8.34.

We claim:
1. A compound selected from the group consisting of compounds of the formula

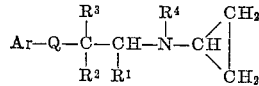

wherein Q is selected from the group consisting of oxygen and sulfur; $R^1$, $R^2$ and $R^3$ are selected from the group consisting of hydrogen and lower alkyl of 1 to 5 carbon atoms; $R^4$ is selected from the group consisting of hydrogen and methyl; and Ar is selected from the group consisting of naphthyl and phenyl; and the salts thereof with pharmaceutically acceptable acids.

2. N-[2-(2-chlorophenoxy)ethyl]cyclopropylamine.

3. N - [2 - (2,4 - dichlorophenoxy)ethyl]cyclopropylamine.

4. N - [2 - (2,4 - dimethylphenoxy)ethyl]cyclopropylamine.

5. N-[2-(2-chlorophenylthio)ethyl]cyclopropylamine.

6. N - [2 - (2 - methoxyphenylthio)ethyl]cyclopropylamine.

References Cited by the Examiner

UNITED STATES PATENTS

| 2,520,516 | 8/1950 | Zoeren | 260—570.7 X |
| 2,683,719 | 7/1954 | Derwin et al. | 260—570.7 X |
| 3,093,639 | 6/1963 | Surrey | 260—570.7 X |

FOREIGN PATENTS 687,189   2/1953   Great Britain.

OTHER REFERENCES

Schmitt et al.: "Bull. Soc. Chim. Biol.," vol. 37 (1955), pages 147–54.

Schmitt: "Arch. Intern. Pharmacodynamie," vol. III (1957), pages 367–80.

CHARLES B. PARKER, *Primary Examiner.*